United States Patent
Rowley

(10) Patent No.: US 8,332,629 B2
(45) Date of Patent: Dec. 11, 2012

(54) MAIL CERTIFICATE RESPONDER

(75) Inventor: Peter Andrew Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 1225 days.

(21) Appl. No.: 11/879,392

(22) Filed: Jul. 16, 2007

(65) Prior Publication Data

US 2009/0025076 A1  Jan. 22, 2009

(51) Int. Cl.
*H04L 29/12* (2006.01)
*H04L 9/08* (2006.01)

(52) U.S. Cl. ............. 713/156; 713/155; 713/168; 726/5

(58) Field of Classification Search .................. None
See application file for complete search history.

(56) References Cited

U.S. PATENT DOCUMENTS

| | | | |
|---|---|---|---|
| 4,868,877 A * | 9/1989 | Fischer | 713/157 |
| 5,996,076 A * | 11/1999 | Rowney et al. | 713/156 |
| 6,061,448 A | 5/2000 | Smith et al. | |
| 6,105,131 A | 8/2000 | Carroll | |
| 6,134,658 A | 10/2000 | Multerer et al. | |
| 7,003,661 B2 * | 2/2006 | Beattie et al. | 713/156 |
| 7,246,378 B1 | 7/2007 | Marvit et al. | |
| 2002/0166049 A1 * | 11/2002 | Sinn | 713/175 |
| 2002/0184444 A1 | 12/2002 | Shandony | |
| 2003/0061144 A1 * | 3/2003 | Brickell et al. | 705/37 |
| 2003/0088678 A1 | 5/2003 | Boreham et al. | |
| 2004/0117626 A1 * | 6/2004 | Andreasyan | 713/175 |
| 2004/0158709 A1 * | 8/2004 | Narin et al. | 713/156 |
| 2004/0199614 A1 | 10/2004 | Shenfield et al. | |
| 2005/0114652 A1 | 5/2005 | Swedor et al. | |
| 2005/0120212 A1 | 6/2005 | Kanungo et al. | |
| 2005/0268090 A1 * | 12/2005 | Saw et al. | 713/156 |
| 2006/0206707 A1 * | 9/2006 | Kostal et al. | 713/156 |
| 2007/0005976 A1 * | 1/2007 | Riittinen | 713/175 |
| 2007/0055867 A1 * | 3/2007 | Kanungo et al. | 713/156 |
| 2007/0130617 A1 * | 6/2007 | Durfee et al. | 726/5 |
| 2010/0138908 A1 * | 6/2010 | Vennelakanti et al. | 726/11 |

OTHER PUBLICATIONS

International Telecommunication Union, "X.500: Information technology—Open Systems Interconnection—The Directory: Overview of concepts, models and services" Feb. 2001.
Miller et al. "Kerberos Authentication and Authorization System" Project Athena Technical Plan, Section E.2.1, Oct. 1988.
Weisner, Christian, "Query Evaluation Techniques for Data Integration Systems", Mar. 2004.
Kanungo, Rajesh et al. U.S. Appl. No. 60/420,313, filed Jun. 2, 2005.
Office Action for U.S. Appl. No. 11/469,459, mailed Aug. 5, 2009.

(Continued)

*Primary Examiner* — Venkat Perungavoor
(74) *Attorney, Agent, or Firm* — Lowenstein Sandler PC

(57) ABSTRACT

A method and apparatus for generating a mail certificate is described. A client determines whether the client possesses a certificate. If a certificate is needed, the client sends a request to a certificate responder for a new certificate in response to the determination. The certificate responder generates and sends the new certificate back to the client.

42 Claims, 7 Drawing Sheets

OTHER PUBLICATIONS

Office Action for U.S. Appl. No. 11/469,459, mailed Mar. 5, 2010.
Final Office Action for U.S. Appl. No. 11/469,459, mailed Jul. 28, 2010.
Office Action for U.S. Appl. No. 11/469,459, mailed Apr. 7, 2011.
Final Office Action for U.S. Appl. No. 11/469,459, mailed Sep. 13, 2011.
U.S. Appl. No. 11/469,459, filed Aug. 31, 2006, Method and System for Dynamic Certificate Generation Using Virtual Attributes.

* cited by examiner

MAIL CERTIFICATE RESPONDER

TECHNICAL FIELD

Embodiments of the present invention relate to certificates, and more particularly to mail certificates.

BACKGROUND

Certificates are useful for large-scale public-key cryptography. Securely exchanging secret keys amongst users becomes impractical to the point of effective impossibility for anything other than quite small networks. Public key cryptography provides a way to avoid this problem. In principle, if Alice wants others to be able to send her secret messages, she needs only publish her public key. Anyone possessing it can then send her secure information. Unfortunately, David could publish a different public key (for which he knows the related private key) claiming that it is Alice's public key. In so doing, David could intercept and read at least some of the messages meant for Alice. But if Alice builds her public key into a certificate and has it digitally signed by a trusted third party (Trent), anyone who trusts Trent can merely check the certificate to see whether Trent thinks the embedded public key is Alice's. In typical Public-key Infrastructures (PKIs), Trent will be a certificate authority (CA), who is trusted by all participants. In a web of trust, Trent can be any user, and whether to trust that user's attestation that a particular public key belongs to Alice will be up to the person wishing to send a message to Alice.

In large-scale deployments, Alice may not be familiar with Bob's certificate authority (perhaps they each have a different CA—if both use employer CAs, different employers would produce this result), so Bob's certificate may also include his CA's public key signed by a "higher level" CA2, which might be recognized by Alice. This process leads in general to a hierarchy of certificates, and to even more complex trust relationships. Public key infrastructure refers, mostly, to the software that manages certificates in a large-scale setting. In X.509 PKI systems, the hierarchy of certificates is always a top-down tree, with a root certificate at the top, representing a CA that is 'so central' to the scheme that it does not need to be authenticated by some trusted third party. Certificates typically take time to be issued as the CA neesd to verify the identity of the user. As such, a need exists for a quick and easy way to obtain a certificate.

BRIEF DESCRIPTION OF THE DRAWINGS

The present invention is illustrated by way of example, and not by way of limitation, in the figures of the accompanying drawings and in which.

DETAILED DESCRIPTION

Figure 1:
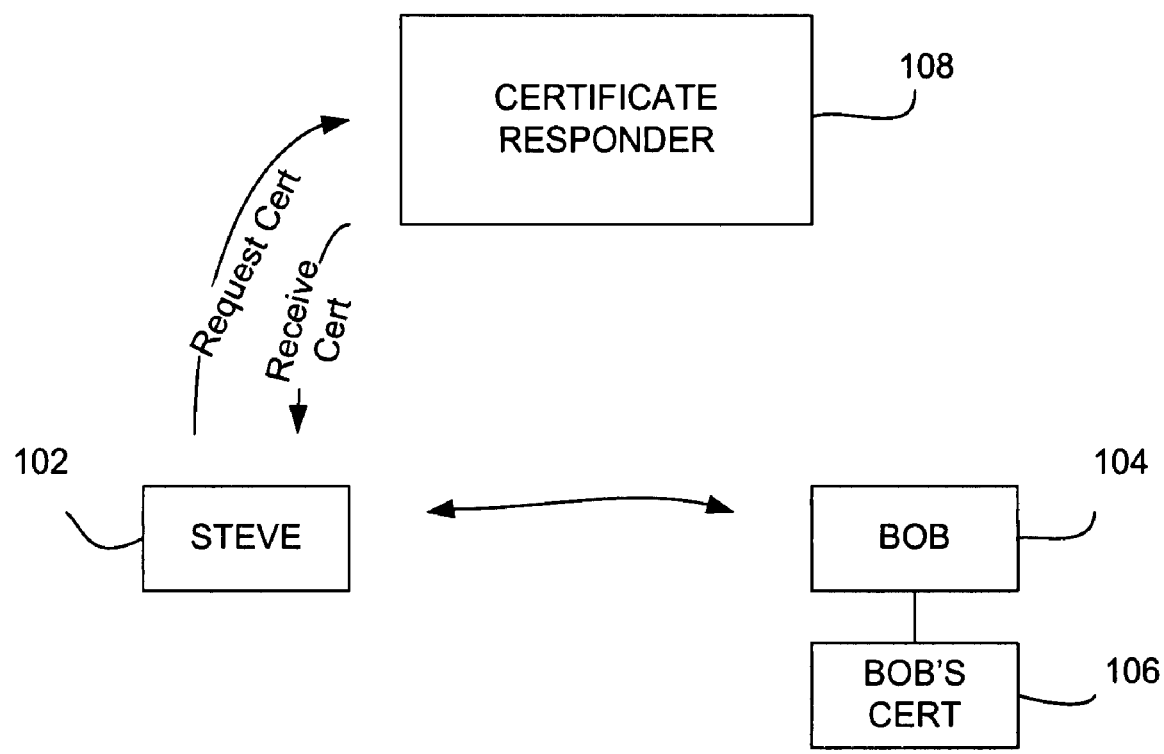
FIG. 1 is a block diagram illustrating a certificate responder system in accordance with one embodiment.

Described herein is a method and apparatus for generating a mail certificate. A client determines whether the client possesses a certificate. If a certificate is needed, the client sends a request to a certificate responder for a new certificate in response to the determination. The certificate responder generates and sends the new certificate back to the client. As such, the certificate responder provides an easy way to obtain and distribute a certificate. In this scheme, a user emails to the certificate responder. In response, the certificate responder sends a reply email containing a fresh certificate for that email address. The user may then save the certificate and use it later.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram illustrating a certificate responder system in accordance with one embodiment. In the example of FIG. 1, a client 102 without a certificate wishes to communicate via email with another client 104 having a certificate 106. Client 102 first determines whether it possesses a certificate. If client 102 determines that a new certificate is needed, client 102 automatically sends a request for a new certificate to a certificate responder 108 that will generate a certificate for client 102. This process provides an easy and fast way for a user to obtain a certificate without having to go through the tedious process of obtaining a certificate through a certificate provider by verifying the user's personal data.

In response to the request from client 102, certificate responder 108 generates a certificate based on the email of client 102. In accordance with one embodiment, the certificate is based only on the email address of client 102. The certificate is then sent back to client 102.

In accordance with another embodiment, the request from client 102 also includes a public key of client 102. As such, when certificate responder 108 generates the certificate, it also encrypts the certificate using the public key of client 102 to secure the return journey of the certificate to client 102.

Figure 2:
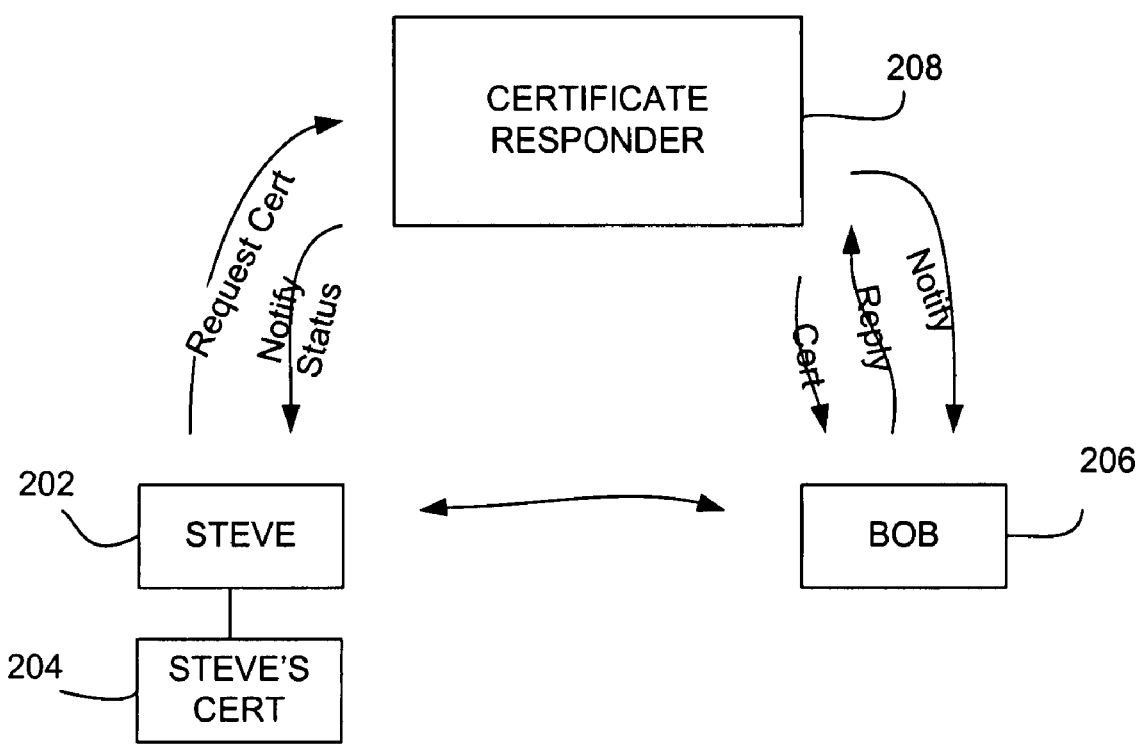
FIG. 2 is a block diagram illustrating a certificate responder system in accordance with another embodiment.

FIG. 2 is a block diagram illustrating a certificate responder system in accordance with another embodiment. In the example of FIG. 2, a client 202 with a certificate 204 wishes to communicate via email with another client 206 without a certificate. In this situation, client 202 may wish to request a certificate for client 206. To do so, client 202 sends a request for a new certificate to a certificate responder 208 that will generate a certificate for client 206. This process provides an easy and fast way for a user to obtain a certificate without having to go through the tedious process of obtaining a certificate through a certificate provider by verifying the user's personal data.

In response to the request from client 202, certificate responder 208 sends a notification email to client 206 to notify that certificate responder 208 is about to generate a certificate for client 206. In accordance with one embodiment, client 206 may reply with a public key of client 206 to certificate responder 208. Certificate responder 208 may then generate a new certificate, encrypt it with the public key of client 206, and send the encrypted certificate back to client 206. In accordance with one embodiment, the certificate is based only on the email address of client 202.

In accordance with another embodiment, client 206 may choose to cancel the request to generate a new certificate upon notification. The process may also be canceled after a predetermined period of time to answer to the notification has expired. While the certificate responder 208 waits for a reply from client 206, client 202 may be notified with a pending status. Similarly, once a certificate has been generated and sent to client 206, a notification of the newly issued certificate to client 206 may be sent to client 202.

Figure 3:
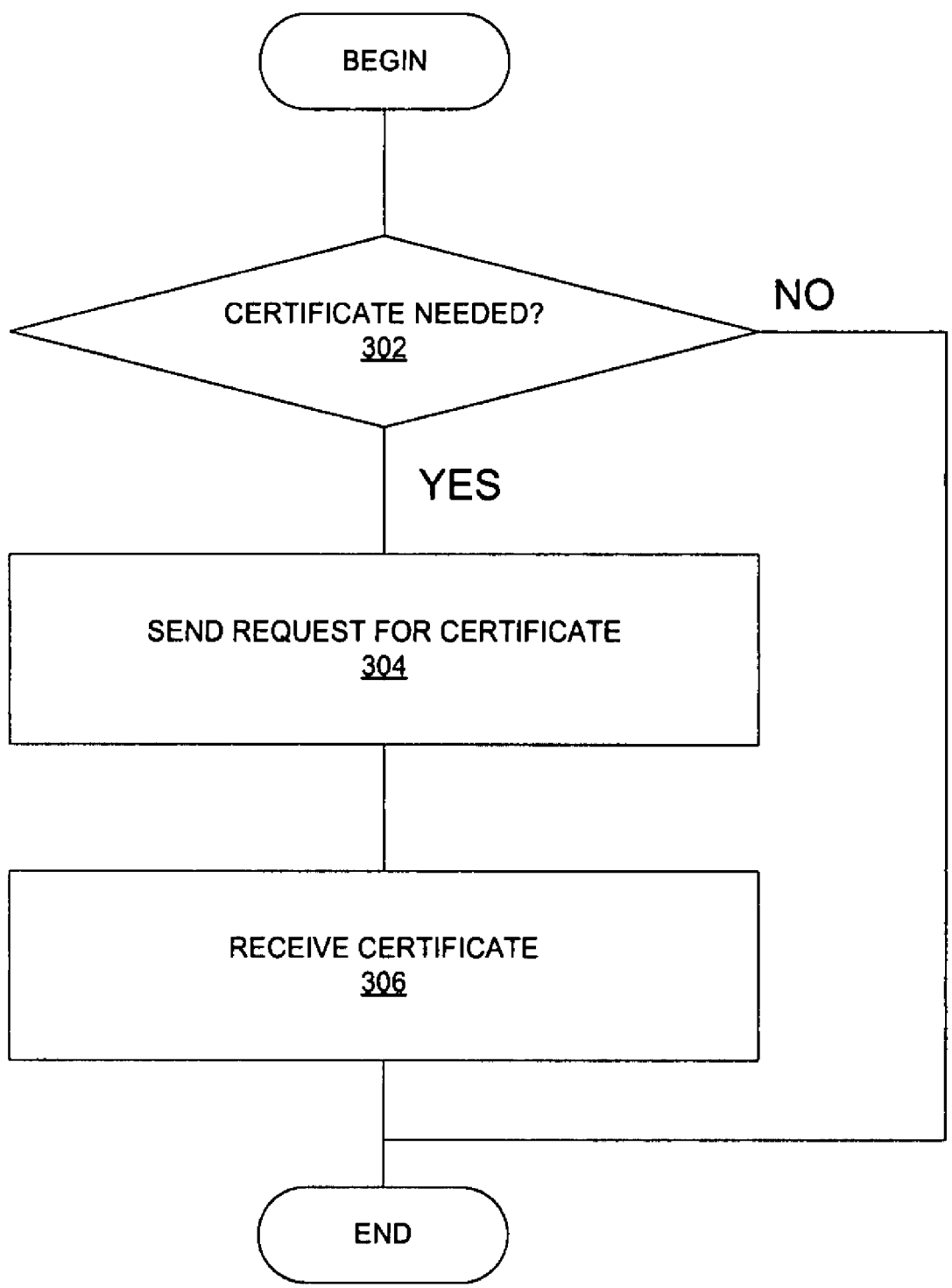
FIG. 3 is a flow diagram illustrating a method for requesting a certificate in accordance with one embodiment.

FIG. 3 is a flow diagram illustrating a method for requesting a certificate in accordance with one embodiment. The method may be performed by a client device ("client"). At 302, a client determines whether it has a certificate. If it is determined that a new certificate is needed, a request via email may be sent out to a certificate responder at 304. In one embodiment, the request may include a public key of the client. At 306, the client receives the newly generated certificate in response to the request. In one embodiment, the received certificate may be encrypted with the public key of the requesting client.

Figure 4:
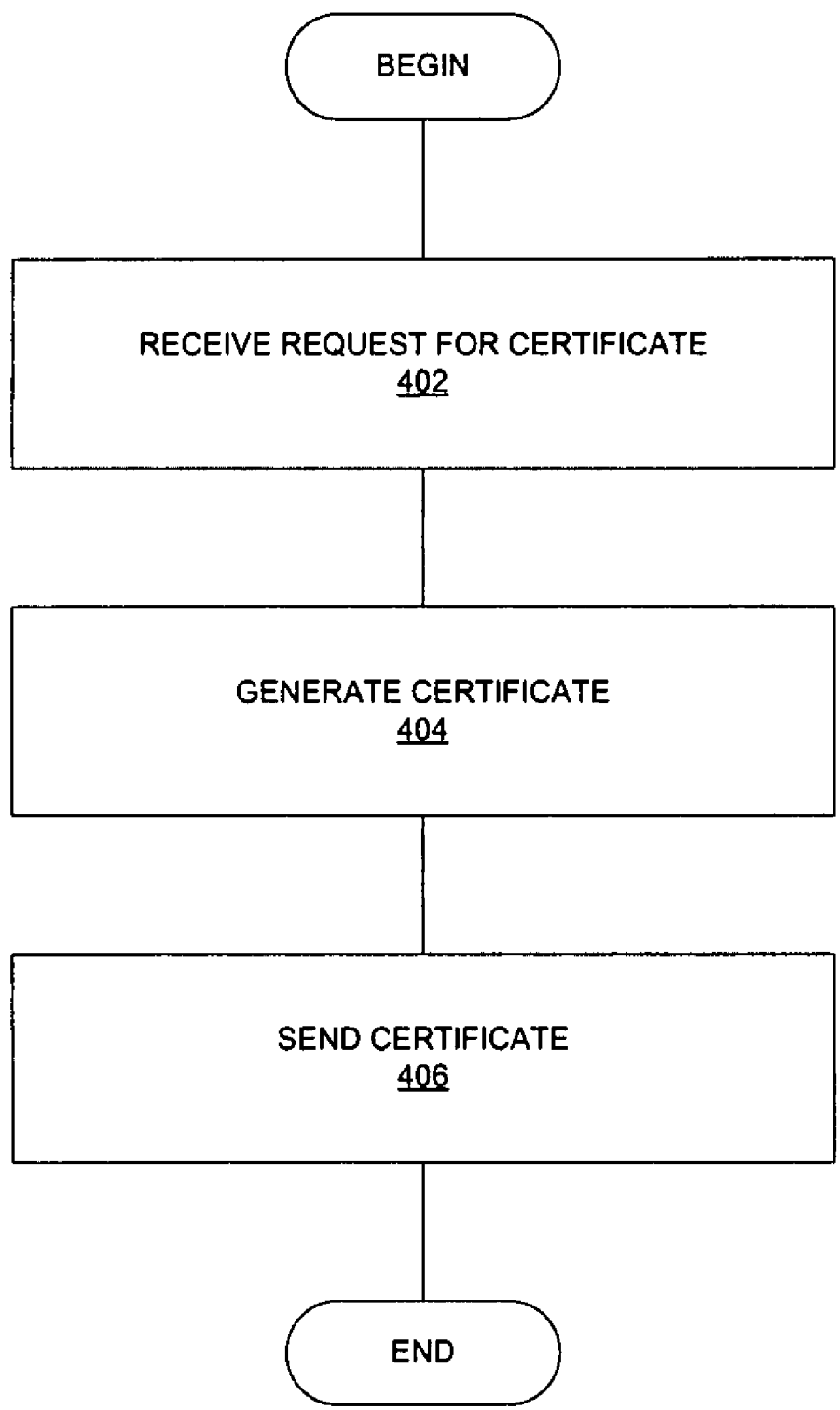
FIG. 4 is a flow diagram illustrating a method for generating a certificate in accordance with one embodiment.

FIG. 4 is a flow diagram illustrating a method for generating a certificate in accordance with one embodiment. The method may be performed by a certificate responder system ("certificate responder"). At 402, a certificate responder receives a request for a new certificate via email from a client. In one embodiment, the request includes a public key of the client. At 404, the certificate responder generates a certificate in response to the request. In one embodiment, the certificate responder further encrypts the certificate based on the public key of the client. At 406, the certificate responder sends the newly generated certificate back to the client.

Figure 5:
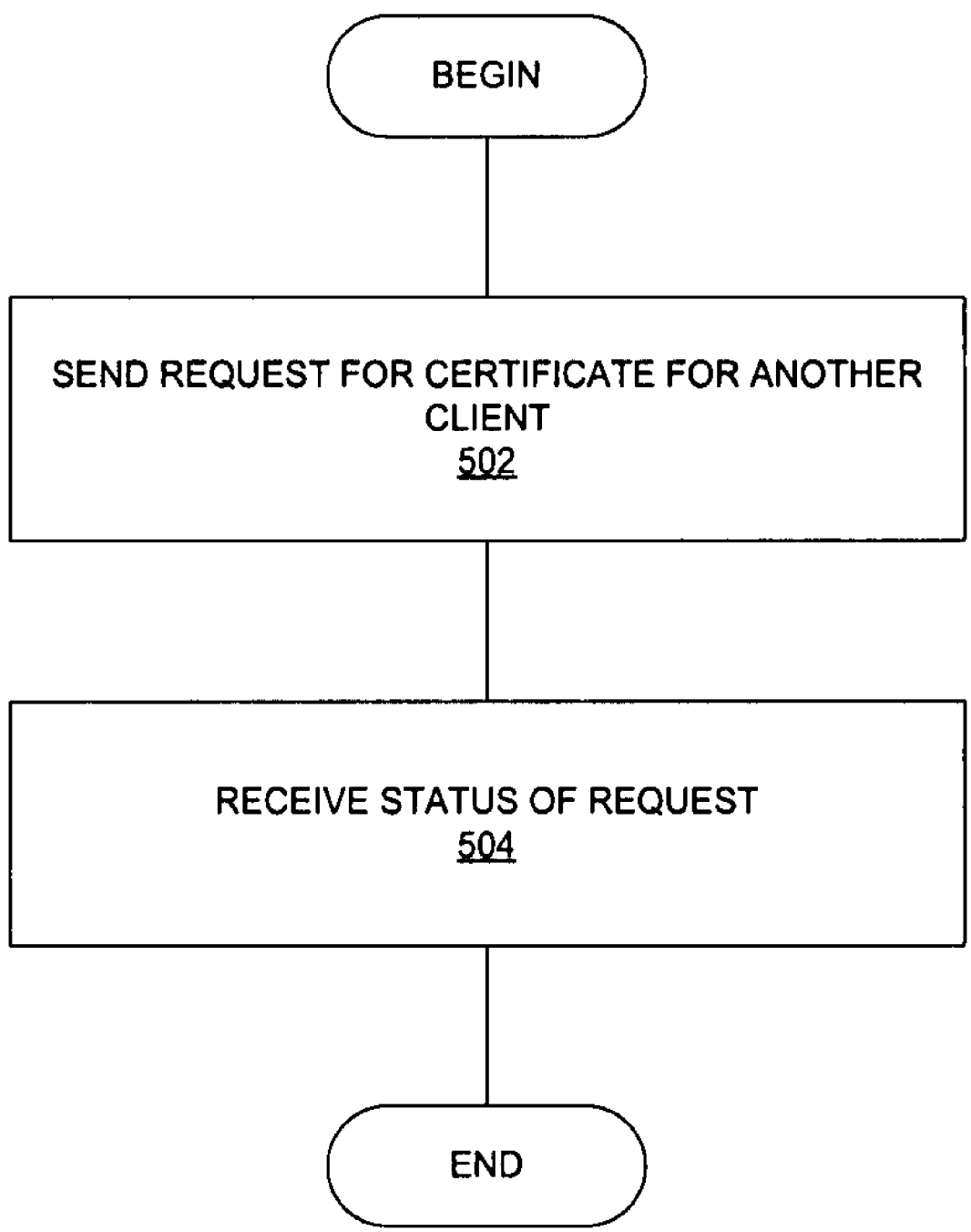
FIG. 5 is a flow diagram illustrating a method for requesting a certificate in accordance with another embodiment.

FIG. 5 is a flow diagram illustrating a method for requesting a certificate in accordance with another embodiment. The method may be performed by a client device ("client"). A client having a certificate wishing to communicate with another client with or without a certificate may send a request to generate a certificate for the other client at 502. The requesting client is notified of the status of the certificate for the other client at 504.

Figure 6:
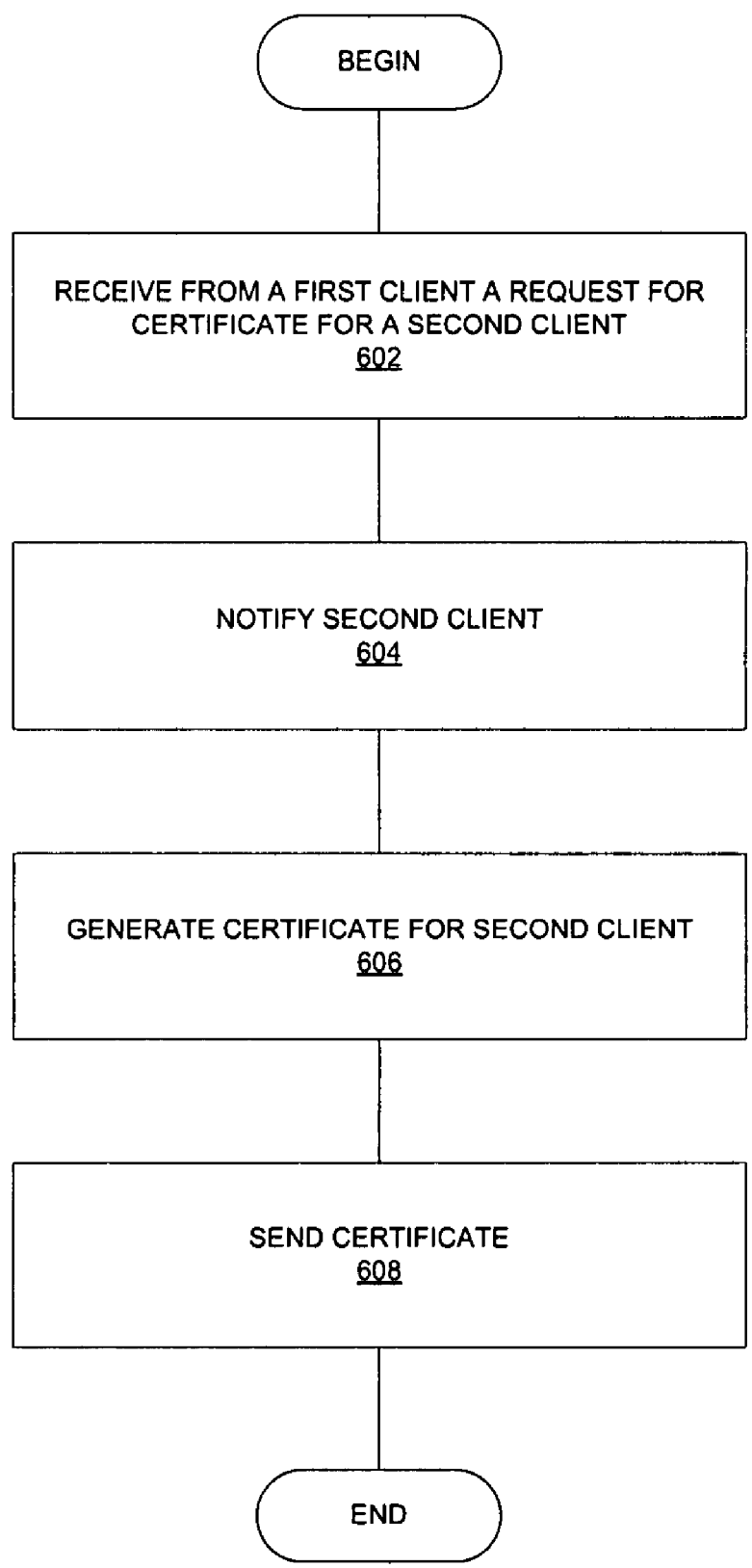
FIG. 6 is a flow diagram illustrating a method for generating a certificate in accordance with another embodiment.

FIG. 6 is a flow diagram illustrating a method for generating a certificate in accordance with another embodiment. The method may be performed by a certificate responder system ("certificate responder"). At 602, a certificate responder receives from a first client a request to generate a certificate for a second client. At 604, the certificate responder notifies the second client of the request. At 606, the certificate responder generates the certificate and sends the certificate at 608. In another embodiment, the certificate responder may receive a reply from the second client in response to the notificiation. The reply may include a cancellation or a public key of the second client. The certificate responder may encrypt the generated certificate with the public key of the second client.

Figure 7:
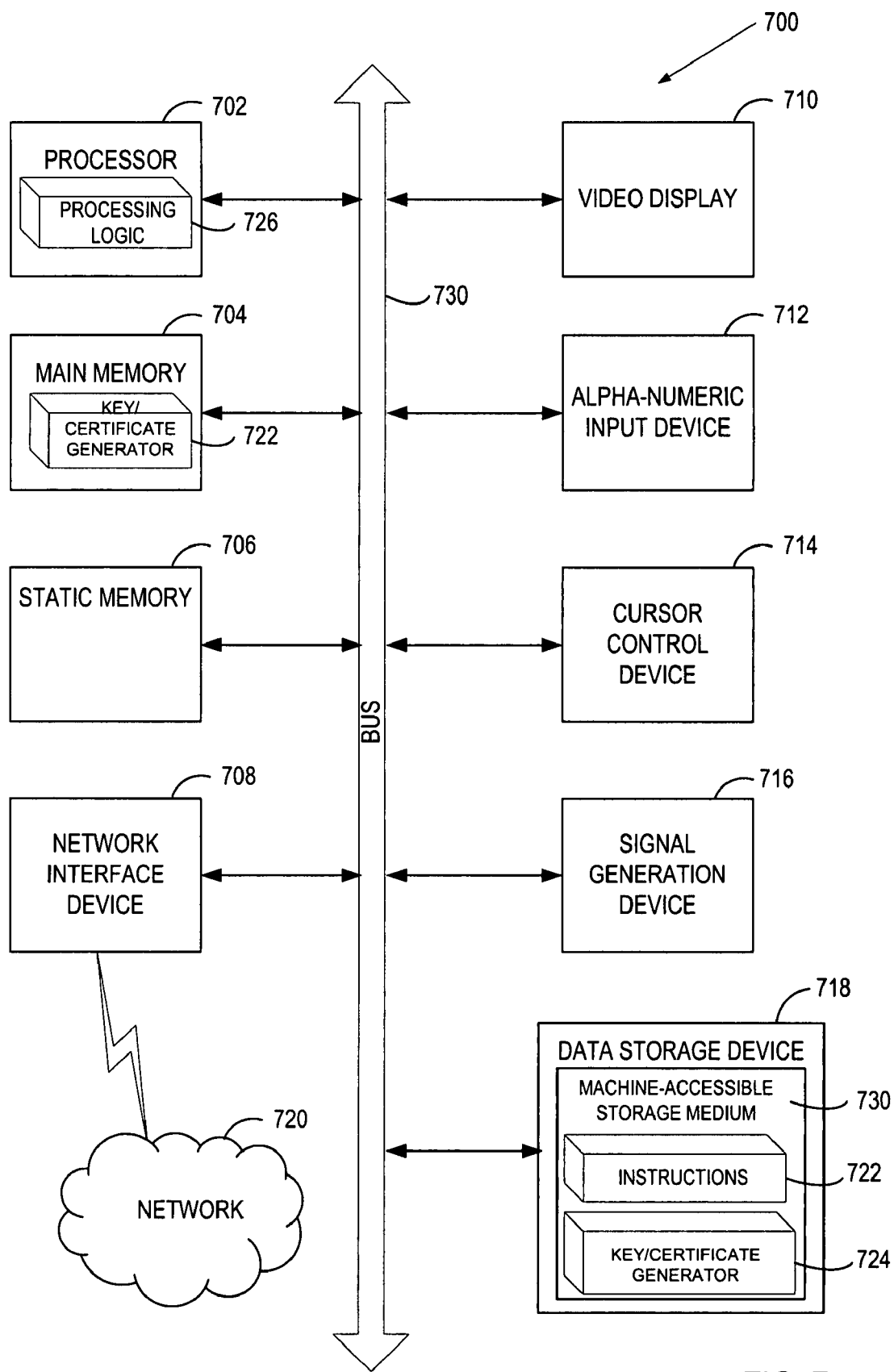
FIG. 7 is a block diagram illustrating an exemplary computer system.

FIG. 7 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508. The machine-accessible storage medium 530 may also be used to store certificates and keys 524. Certificates may be issued to clients.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In another embodiment, both clients may be without certificates. As such, the first client may request its own certificate and also may request a certificate for the second client.

Thus, a method and apparatus for generating certificates has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   determining, by a client device, whether a certificate is associated with the client device;
   sending, by the client device, a request to a certificate responder for a new certificate in response to the determination;
   receiving, by the client device, a pending status from the certificate responder; and
   receiving, by the client device, the new certificate from the certificate responder in response to the request.

2. The method of claim 1, further comprising sending the request and receiving the new certificate via email.

3. The method of claim 1, further comprising sending a public key of the client device with the request.

4. The method of claim 3 wherein the new certificate is encrypted with the public key of the client device.

5. The method of claim 1 wherein the new certificate is associated with an email address of the client device.

6. A computer-implemented method comprising:
   receiving, by a server computer system, a request for a new certificate from a client device;
   sending, by the server computer system, a pending status to the client device;
   generating, by the server computer system, the new certificate based on an email address of the client device and not based on other identifiers; and
   sending, by the server computer system, the new certificate to the client device.

7. The method of claim 6, further comprising sending the request and receiving the new certificate via email.

8. The method of claim 6 wherein the request comprises a public key of the client device.

9. The method of claim 8 further comprising:
   encrypting the new certificate with the public key of the client device.

10. The method of claim 6 wherein the request is received in response to a determination at the client device that the client device is not associated with a certificate.

11. An apparatus comprising:
    a processing device configured to determine whether a certificate is associated with a client, to send a request to a certificate responder for a new certificate in response to the determination, to receive a pending status from the certificate responder, and to receive the new certificate from the certificate responder in response to the request.

12. The apparatus of claim 11 wherein the request and the new certificate are respectively sent and received via email.

13. The apparatus of claim 11 wherein a public key of the client is sent with the request.

14. The apparatus of claim 13 wherein the new certificate is encrypted with the public key of the client.

15. The apparatus of claim 11 wherein the new certificate is associated with an email address of the client.

16. An apparatus comprising:
    a processing device; and
    a certificate responder, executable by the processing device to receive a request for a new certificate from a client, to send a pending status to the client, to generate the new certificate based on an email address of the client and not based on other identifiers, and to send the new certificate to the client.

17. The apparatus of claim 16 wherein the request and the new certificate are respectively received and sent via email.

18. The apparatus of claim 16 wherein the request comprises a public key of the client.

19. The apparatus of claim 18 wherein the certificate responder is to further encrypt the new certificate with the public key of the client.

20. The apparatus of claim 16 wherein the request is received in response to a determination at the client that the client is not associated with a certificate.

21. A non-transitory computer-readable medium containing data and instructions to cause a processing device to perform operations comprising:
- determining, by the processing device of a client device, whether a certificate is associated with the client device;
- sending, by the processing device, a request to a certificate responder for a new certificate in response to the determination;
- receiving, by the processing device, a pending status from the certificate responder; and
- receiving, by the processing device, the new certificate from the certificate responder in response to the request.

22. The non-transitory computer-readable medium of claim 21, further comprising sending the request and receiving the new certificate via email.

23. The non-transitory computer-readable medium of claim 21, further comprising sending a public key of the client device with the request.

24. The non-transitory computer-readable medium of claim 23 wherein the new certificate is encrypted with the public key of the client device.

25. The non-transitory computer-readable medium of claim 21 wherein the new certificate is associated with an email address of the client device.

26. A non-transitory computer-readable medium containing data and instructions to cause a processing device to perform a method comprising:
- receiving, by the processing device of a server computer system, a request for a new certificate from a client device;
- sending, by the processing device, a pending status to the client device;
- generating, by the processing device, the new certificate based on an email address of the client device and not based on other identifiers; and
- sending, by the processing device, the new certificate to the client device.

27. The non-transitory computer-readable medium of claim 26, further comprising sending the request and receiving the new certificate via email.

28. The non-transitory computer-readable medium of claim 26 wherein the request comprises a public key of the client device.

29. The non-transitory computer-readable medium of claim 28 wherein the method further comprises:
- encrypting the new certificate with the public key of the client device.

30. The non-transitory computer-readable medium of claim 26 wherein the request is received in response to a determination at the client device that the client device is not associated with a certificate.

31. A computer-implemented method comprising:
- receiving, by a server computer system, a request from a first client device to generate a new certificate for a second client;
- providing a pending status to the first client device until the new certificate is sent to the second client; and
- sending, by the server computer system, the new certificate to the second client.

32. The method of claim 31 further comprising:
- notifying the second client that the new certificate is to be generated;
- receiving a public key from the second client; and
- encrypting the new certificate with the public key of the second client.

33. The method of claim 31 wherein the new certificate is associated with an email address of the second client.

34. The method of claim 31 further comprising:
- receiving a cancellation request from the second client.

35. An apparatus comprising:
- a processing device; and
- a certificate responder, executable by the processing device to receive a request from a first client to generate a new certificate for a second client, to provide a pending status to the first client until the new certificate is sent to the second client, and to send the new certificate to the second client.

36. The apparatus of claim 35 wherein the certificate responder is to further notify the second client that the new certificate is to be generated, to receive a public key from the second client, and to encrypt the new certificate with the public key of the second client.

37. The apparatus of claim 35 wherein the new certificate is associated with an email address of the second client.

38. The apparatus of claim 35 wherein the certificate responder is to further receive a cancellation request from the second client.

39. A non-transitory computer-readable medium containing data and instructions to cause a processing device to perform a method comprising:
- receiving, by the processing device of a server computer system, a request from a first client device to generate a new certificate for a second client device;
- providing, by the processing device, a pending status to the first client until the new certificate is sent to the second client; and
- sending, by the processing device, the new certificate to the second client device.

40. The non-transitory computer-readable medium of claim 36 wherein the method further comprises:
- notifying the second client device that the new certificate is to be generated;
- receiving a public key from the second client device; and
- encrypting the new certificate with the public key of the second client device.

41. The non-transitory computer-readable medium of claim 36 wherein the new certificate is associated with an email address of the second client device.

42. The non-transitory computer-readable medium of claim 36 wherein the method further comprises:
- receiving a cancellation request from the second client device.

* * * * *